(12) United States Patent
Nichols et al.

(10) Patent No.: US 6,833,485 B2
(45) Date of Patent: Dec. 21, 2004

(54) LOW ENERGY METHOD OF PYROLYSIS OF HYDROCARBON MATERIALS SUCH AS RUBBER

(75) Inventors: Ronald E. Nichols, Evergreen, CO (US); Alan M. Levine, Monroeville, PA (US); Jules E. Langlois, New Kensington, PA (US)

(73) Assignee: RJ Lee Group, Inc., Monroeville, PA (US)

(*) Notice: Subject to any disclaimer, the term of this patent is extended or adjusted under 35 U.S.C. 154(b) by 0 days.

(21) Appl. No.: 09/925,401

(22) Filed: Aug. 9, 2001

(65) Prior Publication Data

US 2002/0072641 A1 Jun. 13, 2002

Related U.S. Application Data

(60) Provisional application No. 60/224,405, filed on Aug. 10, 2000, and provisional application No. 60/224,029, filed on Aug. 10, 2000.

(51) Int. Cl.$^7$ .............................. C07C 4/06; C10G 9/00
(52) U.S. Cl. ...................... 585/241; 208/106; 208/125; 208/126
(58) Field of Search .................. 585/241; 208/106, 208/113, 126

(56) References Cited

U.S. PATENT DOCUMENTS

| | | |
|---|---|---|
| 1,680,908 A | 8/1928 | Nishida et al. |
| 4,250,158 A | 2/1981 | Solbakken et al. |
| 4,300,009 A | 11/1981 | Haag et al. |
| 4,432,890 A | 2/1984 | Beck et al. |
| 4,463,203 A | 7/1984 | Gi |
| 4,740,270 A | 4/1988 | Roy |
| 4,948,495 A | 8/1990 | Coburn |
| 4,977,839 A | 12/1990 | Fochtman et al. |
| 5,087,375 A | 2/1992 | Weinwurm |
| 5,114,541 A | 5/1992 | Bayer |
| 5,230,777 A | 7/1993 | Jarrell |
| 5,233,109 A | 8/1993 | Chow |
| 5,354,930 A | 10/1994 | Atkins et al. |
| 5,359,061 A | 10/1994 | Evans et al. |
| 5,411,714 A | 5/1995 | Wu et al. |
| 5,555,823 A | 9/1996 | Davenport |
| 5,618,407 A | 4/1997 | Kallenbach et al. |
| 5,662,052 A | 9/1997 | McIntosh et al. |
| 5,711,235 A | 1/1998 | May et al. |
| 5,720,232 A | 2/1998 | Meador |
| 5,744,668 A | 4/1998 | Zhou et al. |
| 5,783,046 A | 7/1998 | Flanigan |
| 5,820,736 A | 10/1998 | Bouziane et al. |
| 5,894,012 A | 4/1999 | Denison |
| 6,063,355 A | 5/2000 | Fujimura et al. |
| 6,170,411 B1 | 1/2001 | An |
| 6,210,562 B1 | 4/2001 | Xie et al. |
| 6,221,329 B1 | 4/2001 | Faulkner et al. |

*Primary Examiner*—Thuan Dinh Dang
(74) *Attorney, Agent, or Firm*—Arnold B. Silverman; Eckert Seamans Cherin & Mellott, LLC

(57) ABSTRACT

A low energy method of pyrolysis of rubber or other hydrocarbon material is provided. The hydrocarbon material is heated while maintaining a vacuum, using a clay catalyst. In an additional embodiment, also under a vacuum and optionally with or without the catalyst, the temperature of the reaction chamber and corresponding fuel input is varied either over time or spatially within the reaction chamber, to take advantage of the exothermic properties of the reaction. With the method of the present invention, an improved solid reaction product can be achieved.

10 Claims, 3 Drawing Sheets

Schematic Drawing of Activation and Reaction Energies for Catalyst Versus No Catalyst.

FIGURE 4. Schematic Drawing of Activation and Reaction Energies for Catalyst Versus No Catalyst.

LOW ENERGY METHOD OF PYROLYSIS OF HYDROCARBON MATERIALS SUCH AS RUBBER

CROSS-REFERENCE TO RELATED APPLICATIONS

This application claims priority under 35 U.S.C. §119(e) to provisional application Ser. No. 60/224,405, filed Aug. 10, 2000, and provisional application Ser. No. 60/224,029, filed Aug. 10, 2000.

FIELD OF THE INVENTION

The present invention relates to a low energy method of pyrolysis of hydrocarbon materials such as rubber, coal, tar sands and the like. The method uses a clay catalyst and negative pressure to achieve lower energy input requirements, and produces improved solid carbonaceous material, oil, and combustible gas products. The system design profiles the energy input to take advantage of the exothermic reaction and optimize the required energy.

BACKGROUND INFORMATION

In the United States, each resident discards approximately one waste tire annually. Discard of tires resulted in accumulation of approximately 242 million wasted tires nationwide in 1990 alone, exclusive of retreads. Waste tires are a minor portion of the solid waste stream yet represent a major disposal problem. While many waste tire incinerators have been designed, incineration may not maximize the potential economic recovery of energy and chemical materials from the tires.

Most tires are disposed of in landfills or in tire storage piles. However, whole waste tires are difficult to dispose of in landfills; they tend to collect gas, harbor rodents, snakes, and mosquitoes, pose a fire hazard, and drift upward in the landfill over time as other wastes consolidate and subside. Nonetheless, landfilling, stockpiling, or illegal disposal continue to be the primary methods of waste tire management.

Pyrolysis involves heating organic materials in the absence of oxygen to convert them to molecularly simpler and smaller organic compounds. When organic wastes such as waste tires are the feedstock, products of the process include char or carbon char, oil and gas. As early as 1830, a developer successfully commercialized an early application of pyrolysis involving the production of liquid products from wood. The production of coke from coal pyrolysis became the most common application of the technology; its use continues today. The use of wood pyrolysis to manufacture creosote oil expanded after the introduction of creosote as a wood preservative in 1838. Pyrolysis of coal and oil shales became common to produce oils in the United States and elsewhere in the mid-1800's. Pyrolysis plants to produce illuminating gas became common worldwide until the invention of the electric light bulb in 1879.

Pyrolysis processes may operate either as batch feed or continuous feed systems. Batch feed systems process a single charge of feed stock at one time. After the required residence time in the batch thermoreactor, solid products and residue are removed. Alternatively, in continuous feed systems, feed stock is conveyed through the thermal reactor, and solid products and residue are continuously discharged.

Pyrolysis relies on the addition of heat to break chemical bonds, providing a mechanism by which organic compounds decompose and vaporize. Most systems for pyrolysis of waste rubber and other hydrocarbons report operating temperatures in the range of about 480° F. to 1740° F. At temperatures above approximately 480° F., shredded tires release increasing amounts of liquid oil products and gases. Above 750° F., depending on the process employed, the yield of oil and solid tire derived char may decrease relative to gas production. Tires contain over 80% carbon and hydrogen, and these elements form the principle constituents of the solid, liquid and gaseous pyrolysis products. In addition to carbon-carbon bonds, decomposition of tires requires the breakage of sulfur-carbon and sulfur-sulfur bonds.

The solid product produced by most pyrolysis processes that use tires or other solid organic feed stocks is termed "tire derived char", "tire derived carbon char", or carbon black. This solid product can be further processed and cleaned to produce a higher grade of carbon black, or it can be marketed directly. Carbon blacks differ in particle size, surface area, average aggregate mass, particle and aggregate mass distributions, structure and chemical composition, and are rated according to industry standards, based on these properties. Conformity with industry standards determines the marketability of the tire derived carbon black. For example, intermediate quality virgin (un-recycled) carbon black is usually used in rubber products, while lower grades are used in products such as hoses and solid (not steel-belted) rubber tires. High purity carbon blacks are used in toner and for electronic sensors.

The surface area of carbon black has a substantial impact on quality and applications; carbon blacks containing submicron particles have a high surface area to volume ratio. The average particle size of a commercial carbon black ranges from approximately 5000 Å for a low cost thermocarbon to approximately 100 Å for the most expensive high color paint carbon. Also important is structure, as measured by aggregate size and shape, the number of particles per aggregate, and their average mass. These characteristics affect aggregate packing and the volume of voids in the bulk material. Void volume is one of the standards by which carbon black grades are judged.

Typically, tire-derived carbon chars produce carbon blacks having particles in the size range of 10 to 100 microns. This particle size range limits the ability of the material to be substituted for standard, less variable, carbon blacks containing submicron particles. However, there are some applications which use carbon black grades containing larger particle sizes, for example, use in plastics to improve weathering resistance, or to impart antistatic and electrically conductive properties. Char or carbon char material generated from pyrolysis can also be used as a source of fuel.

Tire pyrolysis also produces a gas that contains combustible concentrations of butane, propane, methane and ethane. Due to large amounts of carbon monoxide and carbon dioxide in the gas, the gas cannot be blended with natural gas for sale. Tire pyrolysis systems can also generate an oil-based liquid similar to Number 6 grade fuel oil; the liquid constitutes approximately 30% to 50% of the product derived from the organic content of the tire feed stock. Due to the high temperature and absence of hydrogen in the reaction mixture, most rubber pyrolysis methods produce a liquid that is high in polyaromatic hydrocarbons (PAH); these compounds are detrimental when released in the environment.

Many methods of pyrolysis have been described in the art using clay as a catalyst or non-sticking agent. See, for example, U.S. Pat. Nos. 1,680,908; 4,463,203; 4,300,009; 4,948,495; 5,114,541; 5,354,930; 5,233,109; and 5,114,541.

These methods use high temperatures, in the range of 200°–800° C. (392°–1492° F.), and do not use negative pressure/vacuum conditions. Other patents have attempted to fine tune the pyrolysis process to favor production of certain products over others; see, for example, U.S. Pat. No. 5,359,061, which discloses pyrolysis of elastomers such as rubber tire scraps using molecular beam mass spectrometry techniques to detect decomposition products and to determine process parameters.

While some patents disclose the use of vacuum conditions, none disclose use of a vacuum in combination with the use of a catalyst. See, for example, U.S. Pat. No. 5,720,230 which provides a method of pyrolysis for discarded rubber tires, using temperatures between about 350° F. and 650° F., under slight vacuum conditions of one half to one inch mercury; and U.S. Pat. No. 4,740,270, which discloses treatment of used rubber tires by vacuum pyrolysis, at a temperature range of about 360° C. to 415° C. (680°–779° F.) under subatmospheric pressure conditions.

In most prior art methods the carbon black derived from pyrolysis of rubber tires has a high inorganic ash content. In addition, carbon black derived in this manner does not meet the industry standards as to particle size, purity and the like. None of the above described methods of pyrolysis of rubber tires and hydrocarbons generally are accomplished at lower temperatures and yet able to produce a higher quality of carbon black and liquid oil low in polyaromatic hydrocarbons as reaction products.

SUMMARY OF THE INVENTION

The present invention solves the above need by providing a low energy method of pyrolysis of hydrocarbon material, including rubber, in which the hydrocarbon material is heated under vacuum conditions, using a clay catalyst. With the method of the present invention an improved solid reaction product can be achieved; carbon black is released from the rubber tires, rather than being created during the pyrolytic process. The addition of a catalyst, in combination with negative pressure conditions, allows the process to proceed at a more rapid rate than other prior art methods. In addition, by drawing the oil and gases to the surface of the rubber during the course of the reaction, the oil and gases are more easily removed from the system. Use of a clay catalyst provides reactive sites within layers of the clay wherein the sites can share electrons with carbon and sulfur molecules in the rubber molecules. This sharing of electrons strains the adjacent carbon-carbon, carbon-sulfur, and/or sulfur-sulfur bonds, destabilizing them and decreasing the energy, and thus the temperature required to promote thermal cracking. The breakage of the bonds involves either free radical formation, ion formation or polarization or a combination of these. Additionally, the catalyst causes steric strain on the bonds which makes them more susceptible to cleavage.

In an additional aspect of the invention, pyrolysis of the hydrocarbon material occurs under vacuum conditions in at least a first, a second and a third phase. By taking advantage of the exothermic nature of the reaction, only as much energy as is required is inputted into the system, preferably in the first and third phases. As the reaction progresses, and particularly during the middle phase of the reaction, less fuel is required to maintain the desired reaction temperature. Thus the fuel input is adjusted over time, providing at least three phases sequentially in time, or spatially inside the reaction chamber.

When a continuous pyrolytic process is used, the fuel input or temperature is varied spatially within the reaction chamber. The rubber or hydrocarbon material moves through the reaction chamber by means of a helicoid auger or other similar device. In the inlet portion of the reaction chamber, corresponding to the first phase of the reaction (the "activation phase"), higher heat input is required to initiate and overcome the activation energy of the reaction, and the inlet portion of the reaction chamber is heated accordingly. The rubber or hydrocarbon material is moved from a first location in the chamber to a second, intermediate location, corresponding to the second phase (the "decomposition phase") of the reaction, where the reaction is exothermic and less heat (fuel) input is required to ensure progress of the reaction. Finally, the rubber or hydrocarbon material is moved to a third location corresponding to the third phase (the "completion phase") of the reaction, where the reaction nears completion and slows, and fuel input is increased to complete the pyrolysis process.

It is an object of the present invention, therefore, to provide a low energy method of pyrolysis of rubber, tar sands, coal or other hydrocarbon materials.

It is an additional object of the present invention to provide a low energy method of pyrolysis, using vacuum conditions and a catalyst.

It is an additional object of the present invention to provide a low energy method of pyrolysis which produces higher quality reaction products.

It is a further object of the invention to provide a low energy method of pyrolysis in which the fuel input is varied over time or spatially to take advantage of the exothermic nature of the reaction.

It is also an object of the present invention to provide an environmentally safe method of recycling rubber tires and other hydrocarbon materials.

These and other objects of the invention will be readily apparent from the following detailed description and appended claims.

BRIEF DESCRIPTION OF THE FIGURES

The invention is further illustrated by the following non-limited drawings in which:

FIG. 4 shows the activation and reaction energies of the reaction with and without a catalyst.

DETAILED DESCRIPTION OF PREFERRED EMBODIMENTS

The present invention provides a low energy method of pyrolysis of hydrocarbon material comprising providing hydrocarbon material; loading the hydrocarbon material into a reaction chamber; adding a catalyst to the reaction chamber; and heating the reaction chamber. This method occurs under vacuum conditions and yields reaction products comprising a carbonaceous solid residue, a liquid hydrocarbon product and a combustible gas.

Figure 1:
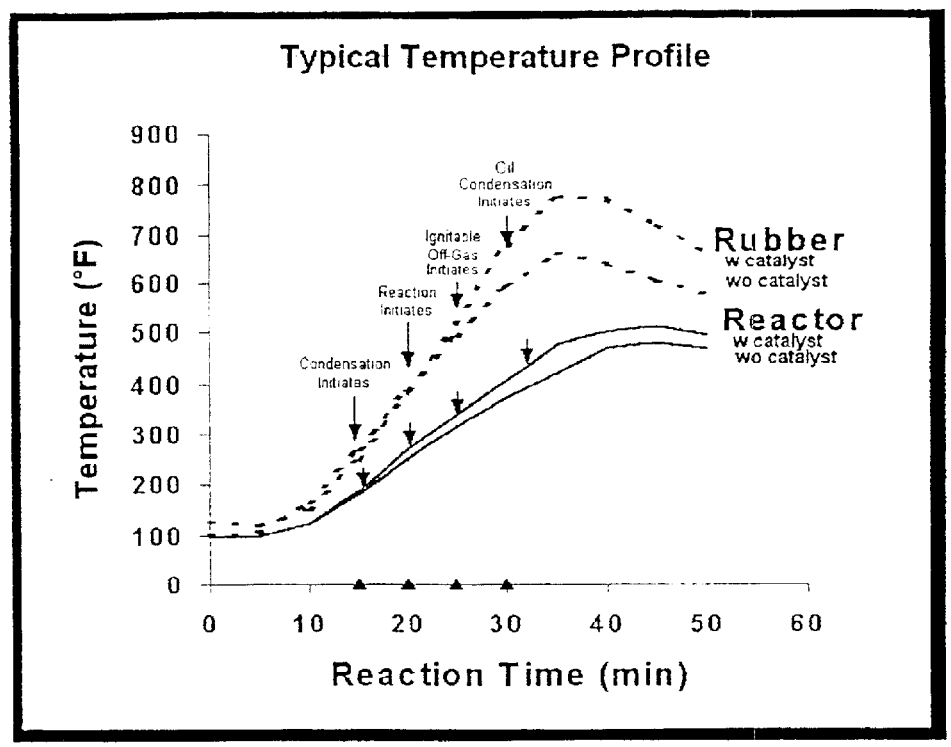
FIG. 1 shows temperature profiles of the reaction with and without use of a catalyst.
Figure 1:
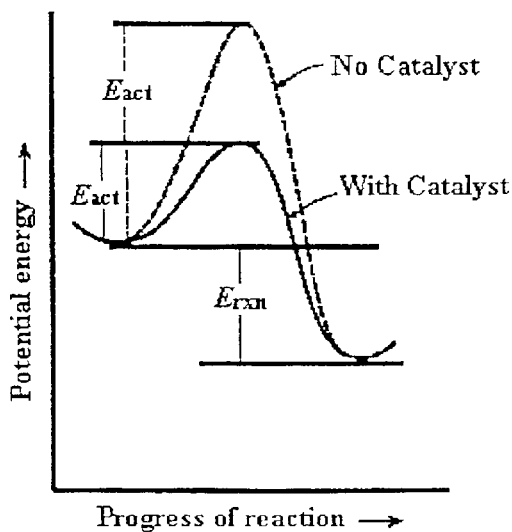

The catalyst in the present invention is a clay catalyst which allows the process to proceed at a more rapid rate with lower energy input than other prior art processes. In addition, use of the clay catalyst in combination with vacuum conditions results in a solid residue of higher quality than that achievable with other methods. The process is designed to optimize energy requirements by 1) utilizing a catalyst to lower the activation energy; 2) recycling combustible gas generated by the process and 3) utilizing energy generated by bond cleavage during the exothermic phase of the reaction. FIG. 1 illustrates the temperature profile in a batch system of the reaction with and without the use of a catalyst. As can be seen in FIG. 1, the temperature of the rubber increases with the use of the catalyst, without a corresponding increase in the reactor temperature. The energy optimization described can be applied in both batch and continuous reactor configurations.

As used herein, the term "clay" refers to smectite ores such as bentonite, and specific clay minerals such as montmorillonite and beidellite and the like. Also included within the scope of the present invention are commercial products containing these clays such as cat litter or oil spill absorbent.

Bentonite can also be modified by the introduction of metal hydroxide "pillars" between the layers. Pillaring clay is a process by which molecules are bound within the layers of clay to prop them open, making the clay more stable at higher temperatures and allowing interaction with larger molecules. Pillared clay is a more effective catalyst because the catalyst is stable over a larger temperature range. The term "clay" refers to any of the above materials.

Typically, the catalyst will be added in an amount of between about 0.01 to 3.0 wt %, based on the total weight of the rubber or hydrocarbon material.

As used herein, the terms "negative pressure conditions" or "vacuum conditions" refer to a vacuum setting of between about 2 to 16 inches mercury.

In one embodiment, when operation is in batch mode, the temperature of the reaction occurs between about 140° F. and 850° F.; energy is added to the system throughout the course of the reaction until oil condensation initiates at which time the heating is ceased. Heating is resumed when the reaction temperature peaks and is continued until completion is noted by leveling of the temperature.

Figure 2:
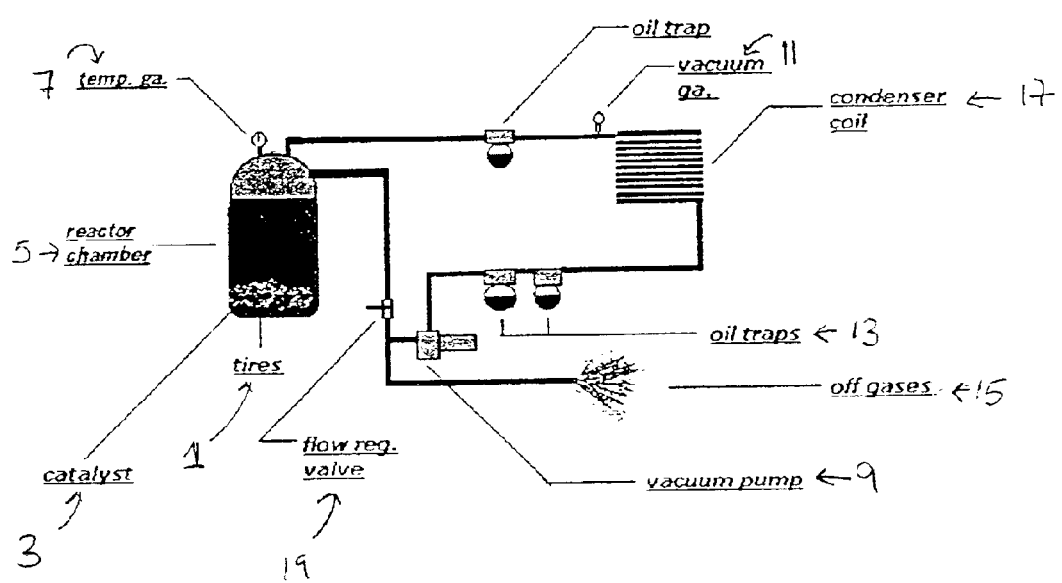
FIG. 2 shows a simple pyrolytic chamber and apparatus for drawing off liquid, solid and gaseous products of the reaction.

FIG. 2 shows an embodiment of a pyrolytic reaction chamber and batch apparatus in which liquid, gaseous and solid reaction products are removed during the pyrolytic process, according to the methods of the present invention. Rubber tires 1 or other hydrocarbon material and a catalyst 3 are placed in the reactor chamber 5 and subjected to heat as measured by the temperature gauge 7, which monitors the heat of the reaction. A vacuum pump 9 maintains a negative pressure throughout the system, as measured by the vacuum gauge 11. Oil traps 13 collect oil produced by the reaction, while gases are vented off 15. A condenser coil 17 condenses the oil, and the flow valve regulator 19 controls the reactor atmosphere and vacuum level. Solid products remain in the reactor chamber 5 where they can be collected after completion of the reaction.

In a further embodiment, in a continuous pyrolytic process, the hydrocarbon material, at ambient temperature, moves from feeder bins into an initial temperature zone in the reactor that controls the heat input required to overcome the activation energy of the reaction, with heat input increasing until a reaction temperature of between about 350° to 850° F. is reached. The rubber or hydrocarbon material moves through the reaction chamber by means of a helical auger or other similar device, and is moved from the first location in the chamber to a second, intermediate location, where heat is decreased to compensate for the exothermic nature of the reaction. Finally, the rubber or hydrocarbon material is moved to an end zone in the reactor, and heat input is increased to complete the cracking process and drive off residual oil and gas. Fuel input is adjusted to maintain the desired reaction temperatures and to take advantage of the exothermic nature of the reaction.

A feeder and recovery system removes the gases from the controlled low temperature reactor chamber, yet allows it to continuously operate under a vacuum.

Figure 3:
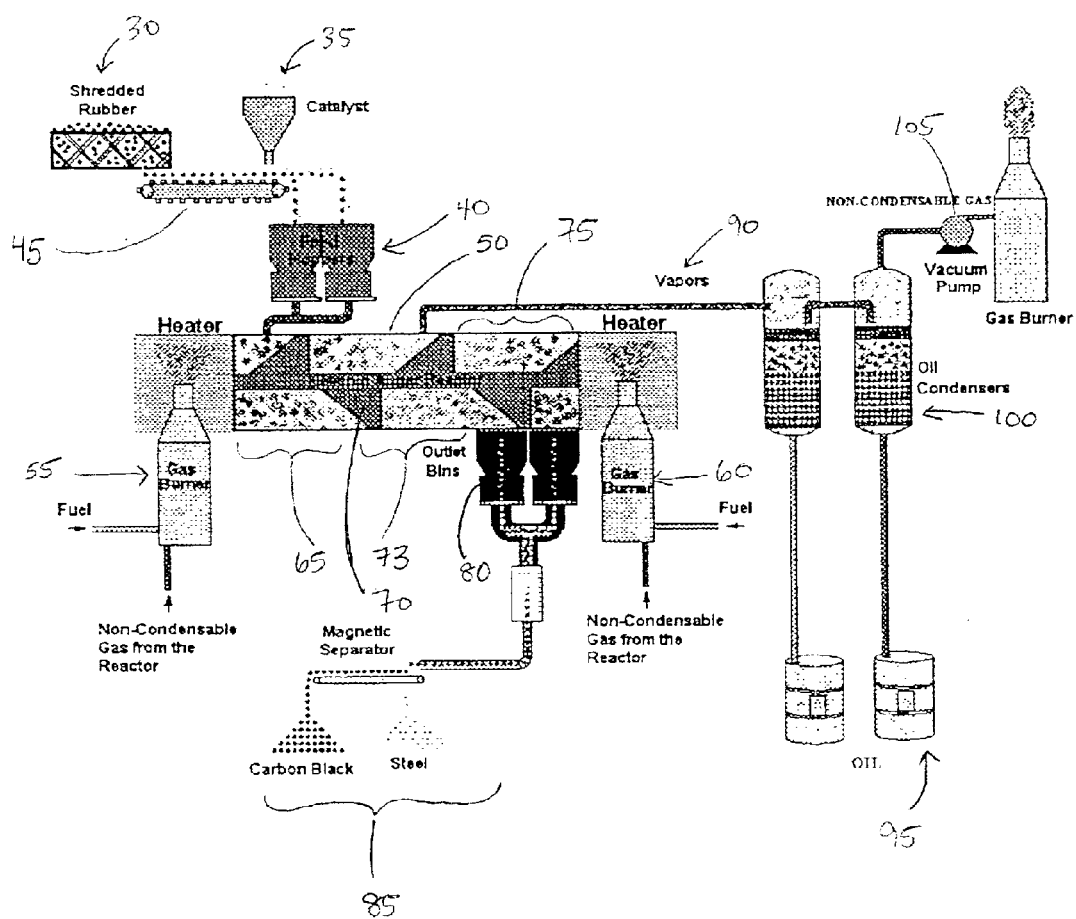
FIG. 3 shows a continuous feed pyrolytic chamber and apparatus for drawing off liquid, solid and gaseous products of the reaction.

An example of a continuous feed system is shown in FIG. 3. Shredded rubber 30 or other hydrocarbon material and a catalyst 35 are moved into inlet bins or feed hoppers 40 by means of a conveyor belt 45 or other similar apparatus. The elongated reaction chamber 50 is heated at both ends by gas burner 55 and gas burner 60. The hydrocarbon material is heated in the activation zone 65, and then moves by means of a helicoid auger 70 to the decomposition zone 73, where the exothermic portion of the reaction occurs. As the reaction slows, the hydrocarbon material is moved by means of the auger to the completion zone 75, after which solid residue moves into the outlet bins 80 to a solid material recovery system 85 to yield carbon black and steel, if initially present. Vapors 90 are continuously drawn off and condensed into oil 95 by a heat exchanger or oil condensers 100 or burned as fuel during the reaction. A vacuum pump 105 draws off the vapors and maintains a vacuum during the course of the reaction.

By knowing the energy requirements for activation of this reaction and the kinetics of energy production of this reaction (as shown in FIG. 4), a spatially variable reactor which controls the energy added to the reactant materials as they move through the reactor can be designed. In addition, since the gas produced contains manageable levels of contaminants, it is collected and added back to the system when needed. This design takes advantage of the thermodynamics of the reaction and is economical.

Whereas particular embodiments of this invention have been described above for purposes of illustration, it will be evident to those skilled in the art that numerous variations of the details of the present invention may be made without departing from the invention as defined in the appending claims.

What is claimed is:

1. A low energy method of pyrolysis of hydrocarbon material comprising:

providing said hydrocarbon material;

loading said hydrocarbon material into a reaction chamber;

adding a clay catalyst to said reaction chamber, and heating said reaction chamber for a sufficient time to provide substantially complete pyrolysis, wherein said heating of said reaction chamber results in a reaction temperature of said hydrocarbon material of between about 150° to 850° F.

said heating occurring in at least a first, second and third phases sequentially over space as said hydrocarbon material moves through said reaction chamber, and fuel input is adjusted to take advantage of the exothermic nature of the reaction;

said method occurring while maintaining a vacuum in said reaction chamber and yielding reaction products comprising carbon black, a liquid hydrocarbon product and a combustible gas.

2. The method of claim 1, wherein said clay is selected from the group consisting of montmorillonite, bentonite, beidillite and combinations thereof.

3. The method of claim 1, wherein said clay is pillared clay.

4. The method of claim 1, wherein said clay is a natural ore.

5. The method of claim 1, wherein said clay catalyst is a commercial clay containing product.

6. The method of claim 5, wherein said commercial clay product is selected from the group consisting of cat litter and oil spill absorbent and combinations thereof.

7. The method of claim 1, wherein said catalyst is added in an amount of about 0.01 wt. % to 3.0 wt. %, based on the total weight of said hydrocarbon material.

8. The method of claim 1, wherein said reaction temperature of said hydrocarbon material is maintained at between about 350° to 850° F.

9. The method of claim 1, wherein said first, second and third phase occur sequentially over time.

10. The method of claim 1, wherein said vacuum is maintained at a pressure of between about 2 inches to 16 inches mercury.

* * * * *